(12) United States Patent  
Ketola

(10) Patent No.: US 7,054,667 B2  
(45) Date of Patent: May 30, 2006

(54) TRANSMITTING INFORMATION BASED ON LOCATION DATA ONTO DISPLAY OF MOBILE STATION

(75) Inventor: Pekka Ketola, Tampere (FI)

(73) Assignee: Nokia Corporation, Espoo (FI)

( * ) Notice: Subject to any disclaimer, the term of this patent is extended or adjusted under 35 U.S.C. 154(b) by 454 days.

(21) Appl. No.: 10/011,052

(22) Filed: Dec. 7, 2001

(65) Prior Publication Data

US 2002/0077121 A1    Jun. 20, 2002

(30) Foreign Application Priority Data

Dec. 15, 2000   (FI)   ................................ 20002760

(51) Int. Cl.  
*H04Q 7/20* (2006.01)  
*H04M 1/00* (2006.01)  
*H04M 3/00* (2006.01)  
*H04M 11/00* (2006.01)

(52) U.S. Cl. .................. 455/566; 455/412.1; 455/466; 455/550.1; 455/456.3; 455/419

(58) Field of Classification Search .. 455/456.1–456.3, 455/456.4, 456.5, 456.6, 457–459, 556.1, 455/556.2, 466, 550.1, 569.1–569.2, 560–561, 455/517, 566, 404.2, 412.1, 412.2, 414.1, 455/415, 433, 418–420, 422.1, 424–425, 455/432.1, 432.3; 715/700, 715, 762–765, 715/808, 864, 526, 703; 345/11, 23–24; 379/88.11, 93.17, 97.23  
See application file for complete search history.

(56) References Cited

U.S. PATENT DOCUMENTS

| | | | |
|---|---|---|---|
| 6,226,367 B1 | 5/2001 | Smith et al. | ................. 379/142 |
| 6,459,440 B1 * | 10/2002 | Monnes et al. | ............. 345/808 |

(Continued)

FOREIGN PATENT DOCUMENTS

WO    WO 97/32439    9/1997

(Continued)

OTHER PUBLICATIONS

Fujino N et al., "Mobile Information Service Based on Multi-agent Architecture" IEICE Trans. Commun. vol. ESO-B, No. 10, Oct. 1997.

(Continued)

*Primary Examiner*—William Trost  
*Assistant Examiner*—Meless Zewdu  
(74) *Attorney, Agent, or Firm*—Perman & Green, LLP

(57) ABSTRACT

A method of transmitting information based on location data from a cellular mobile network to the display of a mobile station, the display comprising a field for displaying graphic information and the cellular mobile network being arranged in a functional connection with a message generation device. In said message generation device, a message is created comprising a definition of the graphic information to be displayed in the field and a definition of updating said graphic information automatically to said field. A target area is defined for said message, the area comprising at least one cell in the cellular mobile network, whereby the message is transmitted via the cellular mobile network to mobile stations located in said target area. The graphic information comprised by said message is displayed in the field on the display of the mobile station in response to the reception of said message.

12 Claims, 2 Drawing Sheets

U.S. PATENT DOCUMENTS

| | | | |
|---|---|---|---|
| 6,522,877 B1 * | 2/2003 | Lietsalmi et al. | 455/422.1 |
| 6,529,723 B1 * | 3/2003 | Bentley | 455/405 |
| 2003/0060215 A1 * | 3/2003 | Graham | 455/456 |

FOREIGN PATENT DOCUMENTS

| | | |
|---|---|---|
| WO | WO 98/56197 | 12/1998 |

OTHER PUBLICATIONS

European Search Report dated Nov. 28, 2003 corresponding to European Application No. 01000606.2.

3GPP TS 03.41 v7.4.0, "3$^{rd}$ Generation Partnership Project; Technical Specification Group Terminals; Technical Realization of Cell Broadcast Service (CBS)"(Release 1998) .

ETSI TS 101 368 v7.0.0, Digital Cellular Telecommunications System (Phase 2+); Example Protocol Stacks For Interconnecting Cell Bradcast Centre (CBC) and Base Station Controller (BSC) (GSM 03.49 version 7.0.0 Release 1998).

"Smart Messaging Specification", Revision 2.0.0, 1999.

* cited by examiner

| | | |
|---|---|---|
| 1 | GS | MC |
| 2 | MC | UN |
| 3 | MI | |
| 4 | MI | |
| 5 | DCS | |
| 6 | PP | |
| 7 | UD | |
| 8 | UD | |
| | ... | |
| 88 | UD | |

FIG. 2

| |
|---|
| \<operator-logo\>::=\<operator-logo-header\>\<line-feed\>\<ota-bitmap\> |
| \<operator-logo-header\>::=\<operator-logo-version\>\<operator-logo-header-body\> |
| \<operator-logo-version\>::="0" |
| \<operator-logo-header-body\>::=\<operator-information\>\<validity-period\> |
| \<operator-information\>::=\<mcc\>\<mnc\> |
| \<mcc\>::=\<common-hex-digit\> |
| \<mnc\>::=\<common-hex-digit\> |
| \<validity-period\>::=\<common-date\> |
| \<UserIntervention\>::=\<common-binary-digit\> |
| \<Size\>::=\<common-hex-digit\> |
| \<ota-bitmap\>::= ... |

FIG. 5

TRANSMITTING INFORMATION BASED ON LOCATION DATA ONTO DISPLAY OF MOBILE STATION

BACKGROUND OF THE INVENTION

1. Field of Invention

The invention relates to services based on location data on mobile stations, particularly to transmitting information based on location data onto the display of a mobile station.

2. Brief Description of Related Developments

Various services based on location data on a mobile station are being developed for present mobile systems. Network operators and service providers operating via them develop present services of mobile systems so as to make them dependent of location data, and also create completely new services based on location data. Services based on location data may be for instance security services, such as emergency or accident notifications directed to a given area, billing service based on location, such as lower tariffs in the area of the home or office cells of a mobile station, positioning services, such as updating location data on a transport company's cars to the office via a mobile network, or general information services, such as information relating to an event or traffic jams in the area of occurrence.

The location of a mobile station can be determined by various methods, each of which provides a different accuracy in defining location data. The location can be determined for example at the accuracy of the cell of the mobile network to which the mobile station is attached at each particular time (COO, Cell of Origin), on the basis of different triangulation methods (E-OTD, Enhanced Observed Time Difference, TOA, Time of Arrival), whereby the signaling of the mobile station to different base stations is utilized, or by means of satellite positioning, such as the GPS system (Global Positioning System). The location update method used in connection with a service typically depends on the accuracy of the location data required for using the service.

The cell broadcast short message service (CBS) has been developed for mobile systems, such as the GSM system (Global System for Mobile Communication), allowing 'broadcast areas' to be determined at the accuracy of a cell, and CB short messages to be transmitted to mobile stations located in the area of the cells. CB short messages comprise text-based messages intended for either all mobile stations in the broadcast area, such as billing zone information messages, or only those mobile stations in the broadcast area that have ordered a given service, such as traffic or weather report messages. CB short messages are thus one-way messages, determined by network operators or service providers operating via them, and transmitted to mobile stations located in a given area. As a technical solution, the transmission of CB short messages largely resembles the transmission of short messages (SMS, Short Message Service) from a mobile station, i.e. the transmission of text messages or SMS messages; even through the structure of said messages slightly differs (the maximum length of a CB message is 93 characters and that of an SMS message 160 characters), and the same kind of certainty of the arrival of CB messages at a mobile station is not received as in the transmission of SMS messages. However, both messages are read on a mobile station typically by browsing through the user interface of the mobile station, typically with the keyboard using a function menu of the mobile station.

The problem in the above arrangement is that CB messages are text-based and difficult to read. A service based on location data on a mobile station is typically delivered to the mobile station when it reaches an area according to a given location definition. In this case the user of the mobile station is mobile, e.g. walking or driving, and browsing through the function menu of the mobile station by means of the keyboard causes the attention to be drawn away from the movement, potentially causing risky situations. Once a received CB message is read, the function menu typically returns to an initial state, and if the information in the CB message is to be reread, said CB message has to be retrieved by browsing through the function menu. A further problem is that the information to be transmitted by means of CB messages is limited; although several CB messages may be chained to one longer message, the transmission of a larger amount of information is not practical by means of CB messages. There is therefore a need for a procedure for transmitting information based on location data to a user of a mobile station illustratively so that reading the information does not require any special measures of the user of the mobile station.

SUMMARY OF THE INVENTION

The object of the invention is thus to provide a method and an apparatus implementing the method so as to allow information based on location data to be transmitted illustratively to a user of a mobile station. The objects of the invention are achieved with a method and a mobile station, which are characterized by what is stated in the independent claims. The preferred embodiments of the invention are disclosed in the dependent claims.

The invention is based on the fact that an operator logo field is typically defined for the display of a mobile station, allowing graphic information (operator logo) to be displayed when the user interface of the mobile station is not browsed. In accordance with the invention the operator logo field can be utilized by adapting the information to be displayed to the user of the mobile station to an operator logo message defining the operator logo and being transmitted to mobile stations fulfilling given location definitions. A definition is added to the syntax of the operator logo message according to which the contents of the message are displayed directly on the display of the mobile station in the operator logo field without an acknowledgement from the user of the mobile station. In accordance with a preferred embodiment of the invention, CB messages transmitted to mobile stations located in a given area can be used for transmitting the operator logo message.

An advantage of the method and mobile station of the invention is that it allows information based on location data to be transmitted to the user of a mobile station illustratively such that reading the information does not require any special measures of the user of the mobile station, such as browsing through a menu. A further advantage of the invention is that is applies messaging methods existing in mobile systems, allowing various services based on location data to be rapidly and easily taken into use.

BRIEF DESCRIPTION OF THE FIGURES

In the following, the invention will be described in greater detail in connection with preferred embodiments with reference to the accompanying drawings, in which

FIG. 2 is a tabular description of the structure of a CB message;

FIG. 5 shows a Smart Messaging™ message defined in accordance with a preferred embodiment.

DETAILED DESCRIPTION OF THE INVENTION

Figure 1:
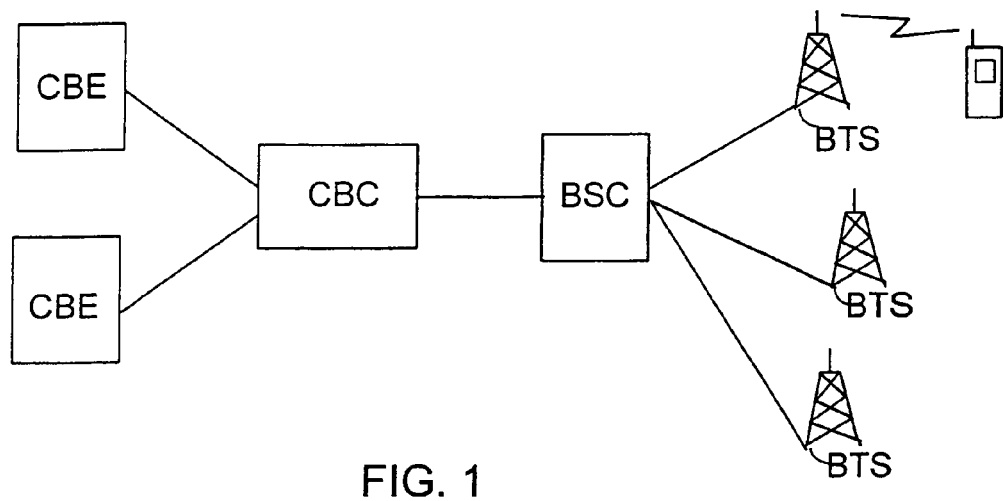
FIG. 1 is a block diagram of the operation of the short message broadcast service in the GSM system.

In the following the operation of the short message broadcast service CBS will be described by way of example in the GSM system with reference to FIG. 1. FIG. 1 only shows the network elements relevant to explaining some embodiments of the invention, but it is understood by a person skilled in the art that the GSM system also comprises other network elements that need not be described herein.

CB messages are created in a cell broadcast entity CBE, which as such is not a GSM-specific network element, but each network operator is allowed to implement the CBE as desired. However, the CBE typically comprises all necessary functionalities for creating CB messages and for dividing long messages into several CB messages. From the point of view of the GSM system, the CBS is managed from a cell broadcast centre CBC, which communicates with one or more CBEs and with one or more base station controllers BSC that cover the entire GSM network of an operator or part thereof. The CBC attends to the modification of messages received from the CBE to a form required by the GSM system. The CBC sees to for example the transmission of CB messages to the BSC, defines a destination area, a transmission time, the retransmission of a message to be repeated at given intervals, and the termination of transmission, and deletes or updates old CB messages at the BSC.

Each BSC is attached to only one CBC, but, on the other hand, each BSC typically controls several base transceiver stations BTS. The BSC attends to the transmission of CB messages to the radio path, its functions including for instance receiving CB messages from the CBC and modifying them to be suitable for the radio path, routing CB messages forward to the right BTSs, storing and retransmitting a message to be repeated at given intervals. The simple task of a BTS is to transmit the CB message to the radio path at the time determined by the BSC.

FIG. 2 shows the structure of a CB message comprising 88 bytes, of which 82 are reserved for actual message information. The CBS typically uses a 7-bit character set, i.e. a maximum of 93 characters can be transmitted in one CB message. The first two bytes of a CB message are reserved for a serial number SN. The first two bits of the serial number define the geographical scope GS of a message, defining as the distribution area a cell-specific definition, location area LA accuracy or the entire operator network. In addition, the information in a CB message can be defined to be displayed directly on the display of the receiving mobile station. The next ten bits are reserved for a message code MC for separating messages originating from the same source under the same message identifier MI. The last four bits of the serial number are reserved for an update number UN of a message to be updated at given intervals (e.g. a weather forecast).

The next two bytes of a CB message are reserved for the MI, which defines the type of CB message involved and who the sender is. Message identifiers are determined for different message types, such as news messages, weather reports, traffic information etc. Furthermore, each operator may define separately special message identifiers for different types of services, in which case the message identifier has to be stored in the mobile station in order for the mobile station to be able to receive the service. The fifth byte of a CB message is reserved for indicating the data coding scheme DCS, which indicates the coding method used for coding the message. The language used in writing the message is also indicated. The sixth byte PP (Page Parameter) determines if the message is long and requires the use of several CB messages. The remaining 82 bytes are reserved for user data, i.e. for actual message information.

For transmission, a CB message is divided into four 22-byte blocks, to each of which a one-byte header field is attached. The blocks are transmitted in succession on a cell broadcast channel CBCH according to the GSM specifications, the frequency and channel specifications of the channel being transmitted to the mobile station on a broadcast control channel BCCH. Accordingly, the transmission of CB messages does not preferably use up the capacity of speech or data channels. A mobile station assembles a transmitted CB message of the blocks received. A detailed description of CBS in the GSM system is found in GSM specification GSM 03.49.

The increasing number of mobile stations and different service applications has increased the need to transmit information and configuration data to mobile stations also from data networks outside a mobile network, such as from the Internet. In the Internet, information is typically expressed in the HTML form (HyperText Mark-up Language), and it is usually not displayable as such on the small display of a mobile station or usable by applications in the mobile station, but the information has to be modified to a form more suitable for the mobile station. Mobile station users are also offered many other services that would be flexibly usable by applications in a mobile station. A praxis developed for this purpose is the Smart Messaging™ concept, allowing information comprised by 'intelligent' messages created in accordance with a given interface specification to be flexibly received and utilized by applications comprised by a mobile station. For example, the information contents in the HTML form are converted in accordance with preset specifications into the TTML format (Tagged Text Mark-up Language), which is displayable by the browser applications of given mobile stations. The information contents may be an information package intended for the use of a given application of a given mobile station model, such as a ringing tone, an operator logo or an image message. Furthermore, the information contents of a Smart Messaging™ message may include configuration data for a mobile station application, such as Internet access settings for said browser application. A detailed description of the Smart Messaging™ concept is found in '*Smart Messaging specification*, rev. 2.0.0., 17 May 1999'.

Figure 3:
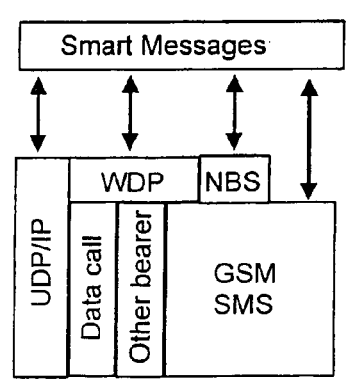
FIG. 3 is a block diagram of the interfaces and network services used by the Smart Messaging™ concept.

The block diagram of FIG. 3 illustrates the interfaces and bearer services used by the Smart Messaging™ concept. Originally, Smart Messaging™ messages were intended to be used by means of short messages, for which an NBS interface (Narrow-Band Socket) is defined, via which a Smart Messaging™ message relayed by means of one or more short messages is directed to the right application. For mobile stations that do not support the NBS interface, key words can be attached to Smart Messaging™ messages, on the basis of which key words the application to be used can be determined from received short messages. Smart Messaging™ messages may also be relayed as WAP messages (Wireless Application Protocol), for which a WDP interface (Wireless Datagram Protocol) is specified, allowing short messages or e.g. a circuit or packet-switched data call to be used as a network service. Smart Messaging™ messages may also be relayed directly immersed in a UDP protocol (User Datagram Protocol).

The Smart Messaging™ concept comprises separate message specifications for e.g. electronic business card messages, service card messages (e.g. timetables), Internet access configurations, calendar updates, ringing tones and graphic messages, such as operator logo messages. Accordingly, a syntax exists for each message type defining the structure of the message and the mobile station application that should be used to open said message. When the NBS and WDP interfaces are used, the application is typically determined on the basis of the TCP/UDP port number used. When Smart Messaging™ messages are relayed by means of short messages, message specifications are modified to a character-based message comprising one or more short messages.

Consequently, for example relaying an operator logo to a mobile station supporting Smart Messaging™ messages via a short message service can be accomplished for example by the user of the mobile station browsing the Internet pages of a service provider providing operator logos and ordering the desired operator logo for example by transmitting the identifier of the operator logo in an SMS message to the service provider's number, such as an SMS message 'logo1' to number 12345. The service provider thus gains access to the number of the mobile station that made the order, and in response the service provider adapts an operator logo message defining the desired operator logo to character-based information that is further adapted to one or more short messages. It is to be noted that Smart Messaging™ messages may be created with any suitable device, such as a computer or a mobile station communicating with for example a mobile network so that said message specifications can be delivered further to mobile subscribers by means of short messages, for example.

A mobile station comprises an application, i.e. means (typically a software process) for generating an operator logo from received short messages and for inputting the operator logo to the display. The syntax of the operator logo message comprises an identifier on the basis of which the mobile station is able to use the right application to create the operator logo. When said operator logo message is received at the mobile station, the user of the mobile station typically displays said operator logo on the display of the mobile station, and if the user wants to keep said logo permanently on the display, this has to be separately acknowledged by means of the user interface of the mobile station, such as a key or menu command. It is typical of Smart Messaging™ messages relayed by means of short messages that they comprise an identifier defining an application or a message type, and that for taking them into use, the user of the mobile station has to make an acknowledgement before their information contents can be utilized in the mobile station.

Figure 4:
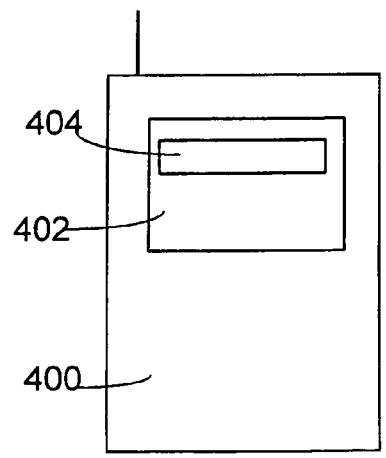
FIG. 4 shows the display to a mobile station, to which an operator logo field is defined.

On the displays of mobile stations, a location is typically determined for displaying the identifier of the mobile network operator used at each particular time, i.e. an operator logo field. FIG. 4 illustrates this. The size of a display 402 in a mobile station 400 may be for example 96×60 pixels or 96×65 pixels, and on the display 402, typically substantially its upper part, is defined an operator logo field 404 whose size may be for example 72×14 pixels. When the mobile station establishes a connection to a mobile network, a message comprising the identifier of a network operator is transmitted from the network, and in response to that message the mobile station inputs an operator identifier typically in text format to the operator logo field 404 of the display 402. This operator identifier is typically always visible on the display of a mobile station when the control menu of the mobile station is not used by means of the user interface, i.e. when the user of the mobile station does not issue control commands to the mobile station or when no other information is displayed on the display of the mobile station, such as a message of arrived SMS messages.

As was described above, at least in mobile stations supporting Smart Messaging™ messages the user of the mobile station may display another identifier in the operator logo field than the default operator identifier in text format. These operator logo messages, which can be ordered in the above-described way from service providers as Smart Messaging™ messages via short messages, may comprise any text-form or graphic information, such as various images. Such a user-set operator logo replaces the default text-form operator identifier and is thus typically displayed on the display of the mobile station always when the control menu of the mobile station is not used by means of the user interface or other information is not displayed on the display of the mobile station.

In accordance with the invention, the above applications can now be utilized by generating on the basis thereof a procedure for relaying information based on location data to the user of a mobile station clearly without the reading of the information requiring any special measures of the user of the mobile station. This is implemented by adapting the information to be displayed to the user of the mobile station to a Smart Messaging™ message that defines the operator logo and is transmitted to mobile stations fulfilling given location specifications. A definition is added to the operator logo message syntax, according to which the contents of the message are directly displayed in the operator logo field on the display of the mobile station without acknowledgement from the user of the mobile station. Any known location determination method may be used for determining the location of the mobile station.

FIG. 5 shows an embodiment of defining an operator logo message such that the contents of the message are directly displayed on the display of the mobile station without acknowledgement from the user. The operator logo message (<operator-logo>) comprises a message header field (<operator-logo-header>) and a graphic operator logo defined as a bit map (<ota-bitmap>). The header field further comprises definitions for the logo version (<operator-logo-version>), which in the present definition is given the value zero, and actual header field information (<operator-logo-header-body>). The header field information, in turn, comprises operator information (<operator-information>) and the validity period of the logo (<validity-period>). In the GSM system, the operator information comprises the operator's GSM country code (<mcc>) and a GSM operator code (<mnc>) as a binary coded decimal number. The validity period of the logo is defined as the end date of the validity period. The bit map message (<ota-bitmap>) defining the graphic operator logo comprises special definitions for e.g. the width and height of the image, the number of colours used, and actual image data.

In accordance with a preferred embodiment of the invention, a definition is added to the above described operator logo message (<operator-logo>), preferably to the header field of the message (<operator-logo-header>) for displaying the graphic operator logo in the message directly on the display of the receiving mobile station. In other words, for example a parameter may be added to the header field to determine if user acknowledgement is needed or if the operator logo is directly conveyed to the display. This parameter (<UserIntervention>) is added to the definition of FIG. 5, and the value zero can be set for this parameter with one bit, for example, if user acknowledgement is required to display the logo, and, similarly, the value one, if the operator logo is automatically conveyed to the display of the receiving mobile station. It is apparent to a person skilled in the art that a similar definition may be carried out in various ways. Consequently, a precise definition of the syntax of the operator logo message is not relevant to the invention, only the ability to determine that an operator logo is directly conveyed to the display of a receiving mobile station.

In accordance with a preferred embodiment of the invention, the syntax of the operator logo message may also comprise the scalability of the operator logo to a larger image. In this case the bit map image comprised by the operator logo could at least temporarily be displayed on the entire display, not only in the operator logo field. The scalability of the operator logo is particularly useful when a PDA (Personal Digital Assistant) type of mobile station is used, which typically comprises a display that is considerably larger than that of a usual mobile station. Furthermore, the resolution of the displays of mobile stations will continue to improve, whereby scalability improves the viewing of graphic information. In the syntax of an operator logo according to FIG. 5, this scalability is defined by a size parameter (<size>), which may for example define the height of the bit map, to which value the width is then proportioned, or vice versa. For example, the default value of the height parameter of the above operator logo field (72×14 pixels) is 14, allowing the size of the image to be increased by increasing this value. Similarly, the same is applicable to the width parameter, if need be, which in the example is 72.

In accordance with a preferred embodiment, the operator logo message is adapted to a CB message transmitted to mobile stations located in the area of given cells. This allows the contents of the message to be defined in the CB message, preferably in its GS bits, to be displayed directly on the display of the mobile station, whereby no measures are required of the user of the mobile station to convey the information received in the CB message to the display.

The procedure of the invention is particularly advantageous in the transmission of graphic information relating to the location of a mobile station, such as transmission of maps or mobility instructions, since a considerable part of the area of the display is available for displaying information. Moreover, a graphic presentation allows a considerably larger amount of information to be displayed in a small space than a text-based presentation, which is emphasized in the method of the invention, wherein information does not have to be browsed, but it is visible on the display as long as a new operator logo message is received or the user of the mobile station starts to browse through the menu of the mobile station. Naturally, the method of the invention does not exclude the display of text-based information in the operator logo field, instead, text-based messages can also be relayed to the display, such as emergency messages or ads.

The following example illustrates the implementation of the invention by means of CB messages. A mobile operator or a service provider operating via the operator offers a service to mobile subscribers, wherein CB messages are used to deliver to the operator logo field as a bit map a graphic image of the map of the area in which the cell is located with which the mobile station communicates at each particular time. A CB message of this type may be specified in the MI of the CB message (e.g. value 900), whereby the same MI (900) has to be defined in the mobile station of a subscriber that signed a service contract in order to enable reception of messages. Furthermore, a CB message with map images is preferably specified for each cell. When the mobile subscriber moves in the area of the mobile network from one cell to another, said cell-specific map image is always transmitted from the mobile network in a CB message, which, in accordance with the invention, is automatically updated in the operator logo field on the display of the mobile station. Consequently, if a mobile subscriber who has signed a service contract for the supply of map images moves in a car, for example, from one cell to another, he automatically receives a map update to the display of his mobile station without his having to browse through the menu of the mobile station or take any other measures that require attention and might cause risky situations. Similarly, another mobile subscriber wishes to receive notifications of any traffic jams in his location area, in which case the service provider defines a special MI for this type of a CB message (e.g. the value 901), and to enable the reception of the messages, the subscriber who signed the service contract has to define the same service-specific MI (901). This way different information can be preferably defined for transmission to mobile stations in the same location area.

The invention is described above by way of example in the GSM system. It is to be noted that the transmission of Smart Messaging™ messages is not restricted to the GSM system, but they can be utilized in any bearer service. Accordingly, the invention is not restricted to the GSM system, but it can be applied to any mobile system comprising a functionality enabling location determination for mobile stations, such as the UMTS (Universal Mobile Telephone System).

Various wireless local communication systems are also known, such as different short-range radio networks, e.g. Bluetooth and HomeRF, systems based on infrared (IR) data transmission and wireless local area networks (WLAN), such as networks complying with the IEEE 802.11 specification. In all these local communication systems, the nodal point responsible for wireless data transmission to terminals generates around itself a cell, allowing the method of the invention, wherein information based on location data is transmitted to terminal users preferably by means of Smart Messaging™ messages by conveying the information automatically to the display of the terminal, to be applied also to these systems.

It should also be noted that although Smart Messaging™ messages are at present the only known way to relay messages as defined in the invention, the invention is not restricted to Smart Messaging™ messages, but the invention and its embodiments may also be implemented by means of a messaging concept implemented in some other corresponding manner.

It is obvious to a person skilled in the art that as technology advances, the basic idea of the invention can be implemented in a variety of ways. The invention and its embodiments are thus not limited to the above examples, but may vary within the claims.

What is claimed is:

1. A method of transmitting information based on location data from a cellular mobile network to a display of a mobile station, the display comprising a field for displaying graphic information and the cellular mobile network being arranged in a functional connection with a message generation device, the method comprising:

creating, in said message generation device, a message comprising data, comprising the graphic information to be displayed in said field and a definition of updating said graphic information automatically to said field, defining a target area for said message, the area comprising at least one cell in the cellular mobile network, transmitting said message via the cellular mobile network to mobile stations located in said target area, and displaying the graphic information comprised by said message in said field on the display of the mobile station which receives the information in response to a reception of said message.

2. A method as claimed in claim 1, wherein said field for displaying graphic information is an operator logo field, and the graphic information to be displayed and its automatic update in said field are determined in an operator logo message.

3. A method as claimed in claim 2, further comprising:

defining, in the operator logo message, the size of the graphic information to be displayed on the display to be larger than a size of the operator logo field, and displaying the graphic information comprised by said message on the display of said mobile station in an area larger than the operator logo field, in response to the reception of said operator logo message in the mobile station.

4. A method as claimed in claim 1, further comprising transmitting said message to mobile stations located in the target area as a cell broadcast message.

5. A method as claimed in claim 4, further comprising:

defining, in an identifier field of a short message transmitted as a cell broadcast, a service with which the graphic information comprised by said cell broadcast message is associated and displaying the graphic information comprised by said message on said display of the mobile station in response to said mobile station being arrange to receive said service on the basis of the identifier field information.

6. A method of transmitting information based on location data from a local communication network onto a display of a wireless terminal, wherein the display comprises a field for displaying graphic information, and wherein the local communication network is arranged in a functional connection with a message generation device, the method comprising:

creating, in said message generation device, a message comprising data comprising the graphic information to be displayed in said field and a definition of updating said graphic information automatically to said field, defining a target area for said message, the area comprising a cell in the local communication network, transmitting said message via the local communication network to terminals located in said target area, and displaying the graphic information, comprised by said message, in said field on the display of the terminal, which receives the information, in response to the reception of said message.

7. A mobile station in a cellular mobile system, comprising:

a display on said mobile station for displaying information to a user of the mobile station, the display comprising:

a field for displaying graphic information, wherein the mobile station is configured to receive a message from a cellular mobile network, said message being transmitted to said mobile station on a basis of location data on the mobile station, and the message comprising data comprising the graphic information to be displayed in said field and a definition of updating said graphic information automatically to said field, and wherein, in response to a reception of said message, the mobile station, which receives the information, is configured to display the graphic information, comprised by said message, in said field comprised by the display of the mobile station without any commands given by the user to the mobile station.

8. A mobile station as claimed in claim 7, wherein said field for displaying graphic information is an operator logo field and said message is an operator logo message.

9. A mobile station as claimed in claim 8, wherein the mobile station is configured to display the graphic information comprised by the operator logo message automatically on the display of said mobile station scaled to a size of the graphic information received, in response to the fact that the size of the graphic information to be displayed on the display is defined in the operator logo message to be unequal to the size of the operator logo field.

10. A mobile station as claimed in claim 7, wherein the mobile station is configured to receive a message from the cellular mobile network as a cell broadcast message.

11. A mobile station as claimed in claim 10, wherein an identifier is stored in the mobile station, on the basis of which identifier the mobile station is configured to receive a service defined by said identifier, the graphic information comprised by said cell broadcast message being associated with the service.

12. Use of an operator logo message in updating graphic information, comprised by the operator logo message, automatically to the display of a mobile station, which receives the information, without any commands given by a user to the mobile station, said operator logo message comprising a definition of updating said graphic information automatically to a field of said mobile station display.

* * * * *